Patented June 7, 1932

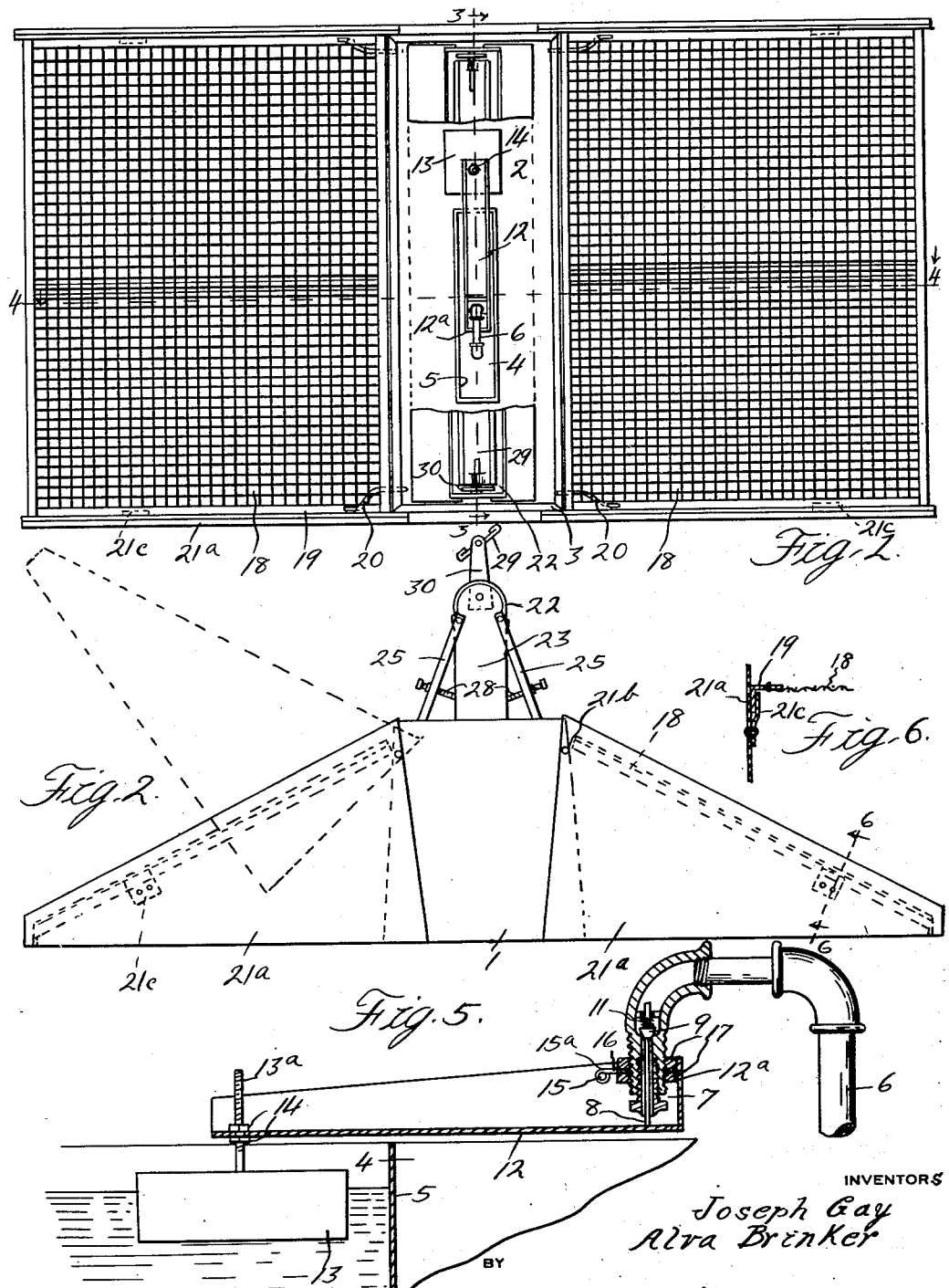

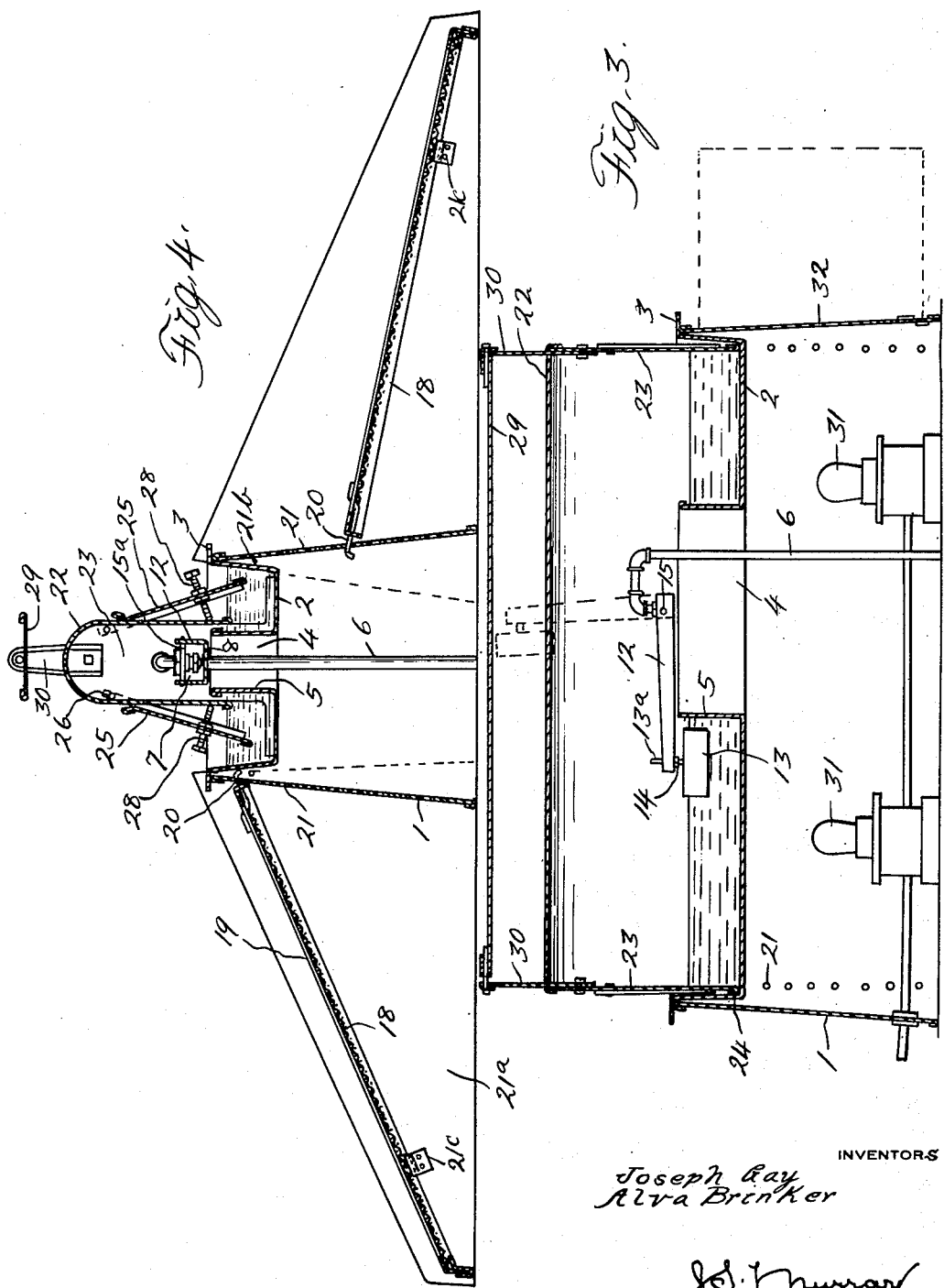

1,862,217

UNITED STATES PATENT OFFICE

JOSEPH GAY AND ALVA BRINKER, OF KINDE, MICHIGAN

POULTRY DRINKING FOUNTAIN

Application filed July 18, 1930. Serial No. 468,781.

This invention relates to poultry drinking fountains and particularly to those to which water is supplied under pressure and maintained at a suitable level therein by a float-operated valve.

An object of the invention is to control the valve of such a drinking fountain by a float arm, forming also a channel to conduct the water to the regulated level.

Another object is to support an elevated poultry drinking trough removably on a hollow base which may receive means for heating the trough, and to further provide a ramp, affording poultry convenient access to said trough.

Further objects are to form said ramp of screen or equivalent material so that it will not retain moisture and to adapt it for selective inclinations to establish its upper end at a distance below the trough edge to accommodate different sizes of poultry.

Still another object is to arrange removable plates at the sides of the ramp excluding poultry from beneath the ramp and thus safeguarding them from the droppings of chickens using the ramp and from such dirt and moisture as will frequently lie beneath the ramp.

Still further objects are to provide a cover structure over the trough preventing poultry and especially chicks, from falling into the trough, to include in said structure one or more cover plates adjustable to regulate the area of exposed water in the trough, and to surmount on said structure a device pivotally movable to prevent perching of the poultry on said structure or device.

Additional objects are to extend a water supply pipe upwardly through an opening in the trough and through a hollow base surmounted by the trough, to protect said pipe against freezing in cold weather to control discharge of water from said pipe into the trough by a suitable float arm, and to adapt the trough for ready removal from said base for cleaning or other purposes without interference by said pipe or float arm.

These and various other objects the invention attains by the construction hereinafter described and illustrated in the accompanying drawings, wherein:

Figure 1 is a top plan view of the improved poultry drinking fountain.

Figure 2 is an end elevational view of the same.

Figure 3 is a longitudinal vertical sectional view taken upon the line 3—3 of Figure 1.

Figure 4 is a transverse sectional elevation taken upon the line 4—4 of Figure 1.

Figure 5 is a fragmentary enlarged vertical section showing detail construction of a valve, controlling water delivery to the drinking trough, and showing the controlling relation of a pivotal float arm to said valve.

Fig. 6 is a fragmentary section taken on the line 6—6 of Fig. 2 and showing primarily a means for holding a vertical plate laterally against said ramp.

In these views the reference character 1 designates a hollow elongated sheet-metal base and open at top and bottom. Carried by said base and fitting within its top portion is a sheet-metal trough 2, marginally flanged at 3 to removably seat upon the top edge of the base. Said trough is formed substantially centrally with an elongated opening 4 from the edge of which a surrounding wall 5 rises to the level of the trough sides and ends. Rising through the base and through the trough opening 4 is a water delivery pipe 6 leading from any suitable source of water under pressure (not shown), and adapted to discharge into said trough. Controlling such discharge is a valve 7, the interior construction of which is best illustrated in Figure 5. Thus a stem 8, vertically and centrally slidable in the casing of said valve, carries a valve member 9 normally held seated by a coiled spring 11, said stem having an actuating portion projecting downwardly through the outlet of said casing.

Pivoted on said casing is one end of a channel-shaped float arm 12, the channel thereof being closed at said end, as indicated at 12a and said valve being positioned in said channel. A float 13 is attached to the other end of said float arm, thereneath, by a substantially vertical threaded stem 13a clamped to the float arm by lock nuts 14. This permits a variable spacing of the float from the arm.

Upon water rising in the trough above a predetermined level, the supported end of the float arm lowers sufficiently to permit the spring 11 to firmly seat the valve member 9, and any lowering of the water below said level will elevate the pivotal end of the float arm so as to unseat said valve member and effect an additional discharge of water into the trough by way of the channeled float arm.

The pivotal connection of the float arm on the valve 7 is preferably vertically adjustable to regulate the working inclination of said arm. Thus the pivot pin 15 mounting said arm is preferably journaled in a bearing 15a marginally carried by a ring 16, clamped between a pair of nuts 17 exteriorly threaded on said valve.

Sanitary supports for poultry using the described fountain are formed by a pair of ramps 18 comprising sheets of wire screen each marginally reinforced by a frame 19 formed preferably of sheet metal bars of angular cross section. The upper end of each ramp, carries preferably adjacent to its side edges, a pair of wire hooks 20, selectively engageable in series of vertically spaced openings 21 in the side walls of the base adjacent its ends. Thus either ramp, at its upper edge, may lie only slightly below the margin of the trough 5, as shown at the left side of Fig. 2, or considerably below the trough as shown at the right hand side of said figure. Also a wide selection of intermediate positions is available by engaging said hooks with intermediate openings of said series.

Formation of the described ramps of screen material is highly desirable from a sanitary standpoint, since the ramps so formed will not readily retain water or dirt and assure the poultry a firm foot hold.

Exclusion of poultry from beneath the ramp is accomplished by mounting a pair of triangular plates 21a (referably sheet-metal) against the sides of each ramp, the larger ends of said plates overlapping the ends of the base 1 and being bolted or otherwise fastened thereto, as at 21b.

Said plates may be swung about the bolts 21b, as shown in the left hand portion of Fig. 2 to allow access for cleaning to the spaces beneath the ramps.

Preferably a simple, quick-detachable interlock is established between the outer portions of said plates and the frames 19 of the ramps by securing small sheet metal plates 21c to the inner faces of the plates 21a and engaging the frame 19 between the plates 21a and 21c, as best appears in Fig. 6.

To prevent poultry, and particularly the smaller ones, from falling into the trough 2, a suitable cover structure for the latter is provided. Thus, a semi-cylindrical sheet metal cover member 22, extending longitudinally of the trough above its central portion, is supported at its ends by vertical sheet metal plates 23, preferably having rolled sheet metal base portions 24 for fitting in the trough against its end walls. A pair of auxiliary cover plates 25 also of sheet metal, are elongated coextensively with the cover 22 and pivoted on the plates 23 to be swung to or from the sides of the trough to regulate the uncovered drinking spaces. The inclination of each cover plate 25 is variable to establish this regulation, by a pair of adjusting screws engaging nuts 28 secured in the end portion of each plate, and adapted to terminally bear on sheet metal skirts depending, preferably integrally, from the member 22.

The unit comprising the parts 22 to 28 inclusive is readily removable from and replaceable in the trough 2 to facilitate cleaning.

It is desirable for sanitary reasons to avoid perching of poultry on any part of the cover structure. The inclination of the cover plates 25 sufficiently prohibits such use thereof, and the semi-cylindrical form of the central cover member 22 accomplishes the same result except as regards its substantially level central portion. The poultry are excluded from this portion by mounting above the same an elongated sheet metal strip 29 journaled at its ends in a pair of brackets 30 rising from the end plates 23. This strip is sufficiently close to the central cover 22 to exclude poultry from beneath said strip, and the pivoting of said strip excludes its use as a perch or foot rest. An electric lamp bulb 31 or other heating means may be disposed within the base 1, in cold weather, to prevent freezing of the water in the trough 2 and pipe 6, and one end 32 of the base may be hinged to give ready access to such heater.

The described poultry fountain is so formed of separable parts as to provide for ready cleaning of said parts and the detachability of said parts furthermore simplifies construction and reduces cost. The majority of the parts may be inexpensively formed as sheet metal stampings. There is shown in dash lines in Figure 3 how the float arm and float may be swung to an upright position to permit ready removal of the trough 2 for cleaning purposes. Any drowning of the small chicks may be positively avoided by properly adjusting the inclined cover plates 25, and cleanliness and sanitation which are so essential to successful poultry farming are greatly promoted by use of the screen-type of ramp and exclusion of poultry from beneath the latter.

While it is apparent that the illustrated embodiment of my invention is well calculated to adequately fulfill the objects and advantages primarily stated, it is to be understood that the invention is susceptible to variation, modification and change within the spirit and scope of the subjoined claims.

Having described our invention, what we claim is:

1. In a poultry drinking fountain, a trough, a base elevating said trough above a supporting surface, and a ramp, forming an approach to said trough, connected to and vertically adjustable on said base.

2. A poultry drinking fountain comprising a trough, a sheet metal base elevating said trough above a supporting surface and formed with a series of vertically spaced socket openings, a ramp forming an approach to said trough, and a member carried by said ramp and selectively engageable in said openings to regulate inclination of the ramp.

3. A poultry drinking fountain comprising a base open at top and bottom, a trough depending into the top portion of said base and marginally flanged to freely rest on the top edge of said base, and a poultry support attachable to said base at selective elevations.

4. A poultry drinking fountain comprising a base open at top and bottom, a trough surmounting said base, a ramp attached at one end to said base and providing an approach to said trough, and a pair of substantially vertical plates engaging the sides of said ramp, excluding poultry from beneath the same.

5. A poultry drinking fountain, a base comprising side and end walls and open at top and bottom, a trough surmounting said base having an opening in its central portion, and provided with a water-retaining flange rising marginally of said opening, a water delivery pipe rising through said base and trough opening, adapted to discharge into the trough, and a valve carried by said pipe, controlling said discharge.

6. In a poultry drinking fountain as set forth in claim 5, a float adapted to ride on the water in said trough, and an arm carrying said float and pivoted on said pipe, exercising automatic control of said valve through rise and fall of the float, and movable about its pivot to register said arm and float vertically with said opening, whereby the trough is removable from said base without interference on the part of said float and arm.

7. A poultry drinking fountain comprising a trough, a cover member elevated above the central portion of said trough and a cover plate pivoted upon said central cover member and extending at an inclination toward a side of the trough, and means for regulating the inclination of said cover plate.

8. In a poultry drinking fountain, the combination with a trough, of a cover structure removably carried by said trough comprising a pair of supports engaging the end portions of the trough, a central cover member extending between said supports at an elevation above the trough and having downwardly sloping sides, and a pair of cover plates pivoted upon said central cover member and downwardly inclined toward the sides of the trough, and means carried by said inclined cover plates for adjusting their angles of inclination to vary the exposed area of water in said trough.

9. In a poultry drinking fountain as set forth in claim 5, a float adapted to ride on the water in said trough, exercising automatic control of said valve through rise and fall of the float, and movable about its pivot to register said arm and float vertically with said opening, whereby the trough is removable from said base without interference on the part of said float and arm, said arm forming a channel to conduct water from said pipe into said trough.

10. In a poultry drinking fountain, a trough, a water delivery pipe having an outlet adjacent to said trough, a valve controlling said outlet, a float adapted to ride on the water in said trough, and a pivoted arm carrying said float exercising automatic control of said valve through rise and fall of the float, and forming a channel to conduct water from said pipe into said trough.

11. In a poultry drinking fountain, a trough, a cover plate for said trough, means pivotally supporting said cover plate upon the trough, and means for angularly adjusting said cover plate about its pivotal axis to vary the area of exposed liquid in the trough.

12. In a poultry drinking fountain, a trough, a ramp extending from one side of said trough, a cover plate carried by the trough, and means for adjusting said cover plate to and from said side to regulate the area of water exposed in the trough adjacent to said side.

13. In a poultry drinking fountain, a trough, a support carried by said trough above its central portion, a pair of cover plates mounted upon said support and adjustable to and from opposite edges of said trough to vary the area of water exposed in the trough adjacent to said edges, and an element rotatively surmounting said support to exclude poultry therefrom.

14. In a poultry drinking fountain, a trough formed with an opening in its central portion and provided with a water-retaining flange rising marginally of said opening, a water delivery pipe rising through said opening, and a member covering said opening removably carried by the trough.

15. In a poultry drinking fountain, a trough, a foraminous ramp providing an approach to said trough, and means for excluding poultry from beneath said ramp.

In testimony whereof we sign this specification:

JOSEPH GAY.
ALVA BRINKER.